(12) United States Patent
Liu

(10) Patent No.: US 8,755,951 B2
(45) Date of Patent: Jun. 17, 2014

(54) MULTIMEDIA SYSTEM FOR VEHICLE WITH PORTABLE DASH PAD

(75) Inventor: Edward Liu, City of Industry, CA (US)

(73) Assignee: Concept Enterprises, Inc., City of Industry, CA (US)

(*) Notice: Subject to any disclaimer, the term of this patent is extended or adjusted under 35 U.S.C. 154(b) by 175 days.

(21) Appl. No.: 13/134,622

(22) Filed: Jun. 10, 2011

(65) Prior Publication Data

US 2012/0316702 A1 Dec. 13, 2012

(51) Int. Cl.
*G01C 21/28* (2006.01)
*G06F 19/00* (2011.01)

(52) U.S. Cl.
USPC ............................... 701/2; 701/36; 340/438

(58) Field of Classification Search
CPC ............. G01C 21/3688; G01C 21/265; G01C 21/3664; G01C 21/28; G06F 1/1632; G06F 1/626; B60K 37/02; B60K 37/04; B60K 37/06
USPC ................. 701/2, 29.1, 36; 348/148; 340/438
See application file for complete search history.

(56) References Cited

U.S. PATENT DOCUMENTS

| | | | | |
|---|---|---|---|---|
| 6,091,956 A * | 7/2000 | Hollenberg | ................ | 455/456.5 |
| 6,124,826 A * | 9/2000 | Garthwaite et al. | ..... | 342/357.46 |
| 6,182,006 B1 * | 1/2001 | Meek | .............................. | 701/538 |
| 6,427,115 B1 * | 7/2002 | Sekiyama | ...................... | 701/526 |
| 6,622,083 B1 * | 9/2003 | Knockeart et al. | ............ | 701/533 |
| 6,681,176 B2 * | 1/2004 | Funk et al. | ...................... | 701/433 |
| 7,498,930 B2 * | 3/2009 | Phillips et al. | ................ | 340/438 |
| 7,634,228 B2 * | 12/2009 | White et al. | ................. | 455/3.06 |
| 7,699,376 B2 * | 4/2010 | Vitito | ........................... | 296/37.8 |
| 7,904,236 B2 * | 3/2011 | Ueno | ............................ | 701/541 |
| 8,355,836 B2 * | 1/2013 | Silvester | ...................... | 701/29.1 |
| 2001/0001319 A1 * | 5/2001 | Beckert et al. | ..................... | 701/36 |
| 2002/0137541 A1 * | 9/2002 | Lepley et al. | ................. | 455/556 |
| 2002/0152027 A1 * | 10/2002 | Allen | ............................ | 701/213 |
| 2006/0123053 A1 * | 6/2006 | Scannell | .................... | 707/104.1 |
| 2010/0198428 A1 * | 8/2010 | Sultan et al. | ...................... | 701/2 |

* cited by examiner

*Primary Examiner* — Tan Q Nguyen

(74) *Attorney, Agent, or Firm* — Marc E. Hankin; Kevin Schraven; Jimmy Sauz

(57) ABSTRACT

A multimedia system for vehicle having a plurality of electrical accessories, including a control housing, a control module, and a dash pad. The control module includes a central processing module. The central processing module is electrically connected with the electrical accessories in such a manner that the central processing module is arranged to centrally control the electrical accessories. The dash pad is detachably mounted on the control housing and is wirelessly communicated with the central processing module, wherein a user is able wirelessly control the electrical accessories in the vehicle through the dash pad.

23 Claims, 5 Drawing Sheets

MULTIMEDIA SYSTEM FOR VEHICLE WITH PORTABLE DASH PAD

BACKGROUND OF THE PRESENT INVENTION

1. Field of Invention

The present invention relates to a multimedia system, and more particularly to a multimedia system for use in vehicle and comprises a dash pad for allowing a user to wirelessly control electrical accessories in that vehicle.

2. Description of Related Arts

Conventionally, a vehicle, such as a car, is usually equipped with a plurality of electronic accessories for allowing the driver or the passengers to perform certain activities while the vehicle is operating. For example, the vehicle may be equipped with a navigation system and a speaker system for navigating and for playing music respectively. The current practice is that each of the electronic accessories requires separate control panels and this has several disadvantages. First, the control panel for a particular electronic equipment is usually mounted at a particular location in the passenger compartment (such as on the dashboard) so that not every person in the vehicle can gain access to that particular control panel. Thus, a passenger sitting in the back seat may not control the navigation system which is mounted on the dashboard of the vehicle. On the other hand, the passenger sitting next to the driver may not control a DVD player mounted on a rear side of the driver seat because the control panel of the DVD player is provided thereon. This imparts great inconvenience to users of the electronic accessories.

Second, most of the electronic accessories provided in the vehicle do not support remote control. Even though there is, each of the electronic accessories requires separate remote control specifically manufactured to operate a particular kind of electronic accessory. For example, a DVD player mounted in the vehicle may have a remote control for allowing a user to operate the DVD player at a distance, but that remote control can only be used for that particular DVD player, and every electronic accessory will have its own remote control. The result is that there exist so many remote controls in the vehicle which may distract the driver and bring great inconvenience to other passengers.

Third, many drivers or passengers may bring their own personal electronic accessories to the vehicle and use them while the vehicle is operating. For example, a driver may bring his or her music player and play his or her songs while driving. Very often, these personal electronic accessories do not have any connection to the electrical accessories equipped in the vehicle. Thus, the user needs to individually control their personal electronic accessories as well as the electronic accessories equipped in the vehicle whenever they wish to use them.

SUMMARY OF THE PRESENT INVENTION

The invention is advantageous in that it provides a multimedia system, and more particularly to a multimedia system for use in a vehicle and comprises a dash pad for allowing a user to wirelessly control electrical accessories in that vehicle.

Another advantage of the invention is to provide a multimedia system for use in a vehicle and comprises a dash pad which is arranged to act as a control panel for remotely controlling a plurality of electrical accessories in the vehicle so as to provide a single point of control to many different electrical accessories in the vehicle.

Another advantage of the invention is to provide a multimedia system, wherein the dash pad may also be used for controlling many personal electrical accessories of the passengers or the driver. Moreover, the dash pad may also be programmed to be used as a tablet computer when it is detached from a control housing. In other words, the user may also use the dash pad even when he or she is not in the vehicle.

Another advantage of the invention is to provide a multimedia system for use in a vehicle and comprises a dash pad which is detachably mounted onto a control housing provided in a vehicle and is remotely communicated therewith to control the corresponding electrical accessories.

Additional advantages and features of the invention will become apparent from the description which follows, and may be realized by means of the instrumentalities and combinations particular point out in the appended claims.

According to the present invention, the foregoing and other objects and advantages are attained by a multimedia system for vehicle having a plurality of electrical accessories, comprising:

a control housing mounted in the vehicle;

a control module which is supported in the control housing, and comprises a central processing module electrically connected with the electrical accessories in such a manner that the central processing module is arranged to centrally control the electrical accessories; and a dash pad detachably mounted on the control housing and is wirelessly communicated with the central processing module, wherein the dash pad comprises a control panel for allowing a user to input control commands on the control panel, wherein the control commands are wirelessly sent to the central processing module and are processed so as to control the corresponding electrical accessories, so that the user is able wirelessly control the electrical accessories in the vehicle through the control panel.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
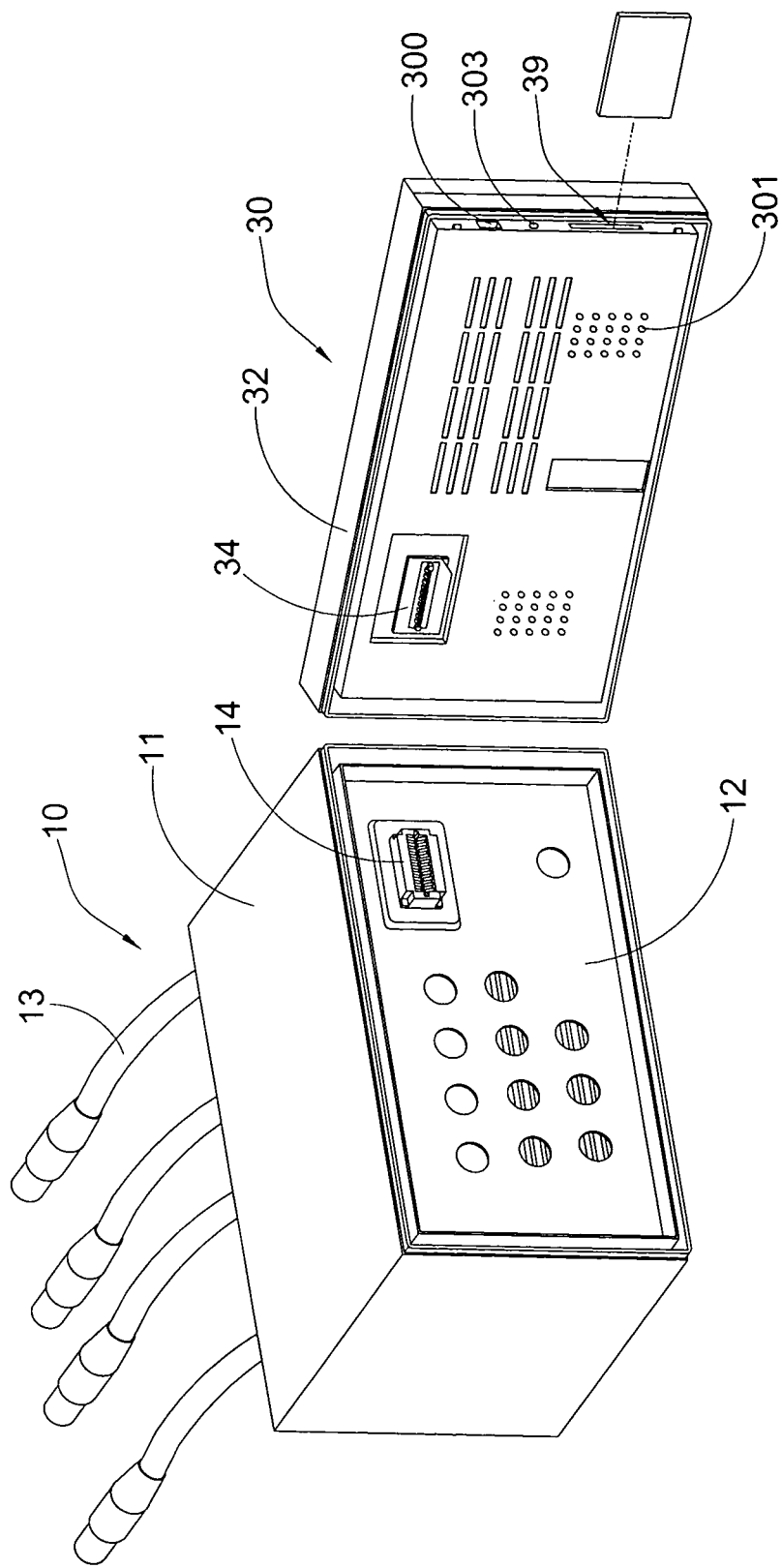
FIG. 1 is a perspective view of a multimedia system according to a preferred embodiment of the present invention.
Figure 2:
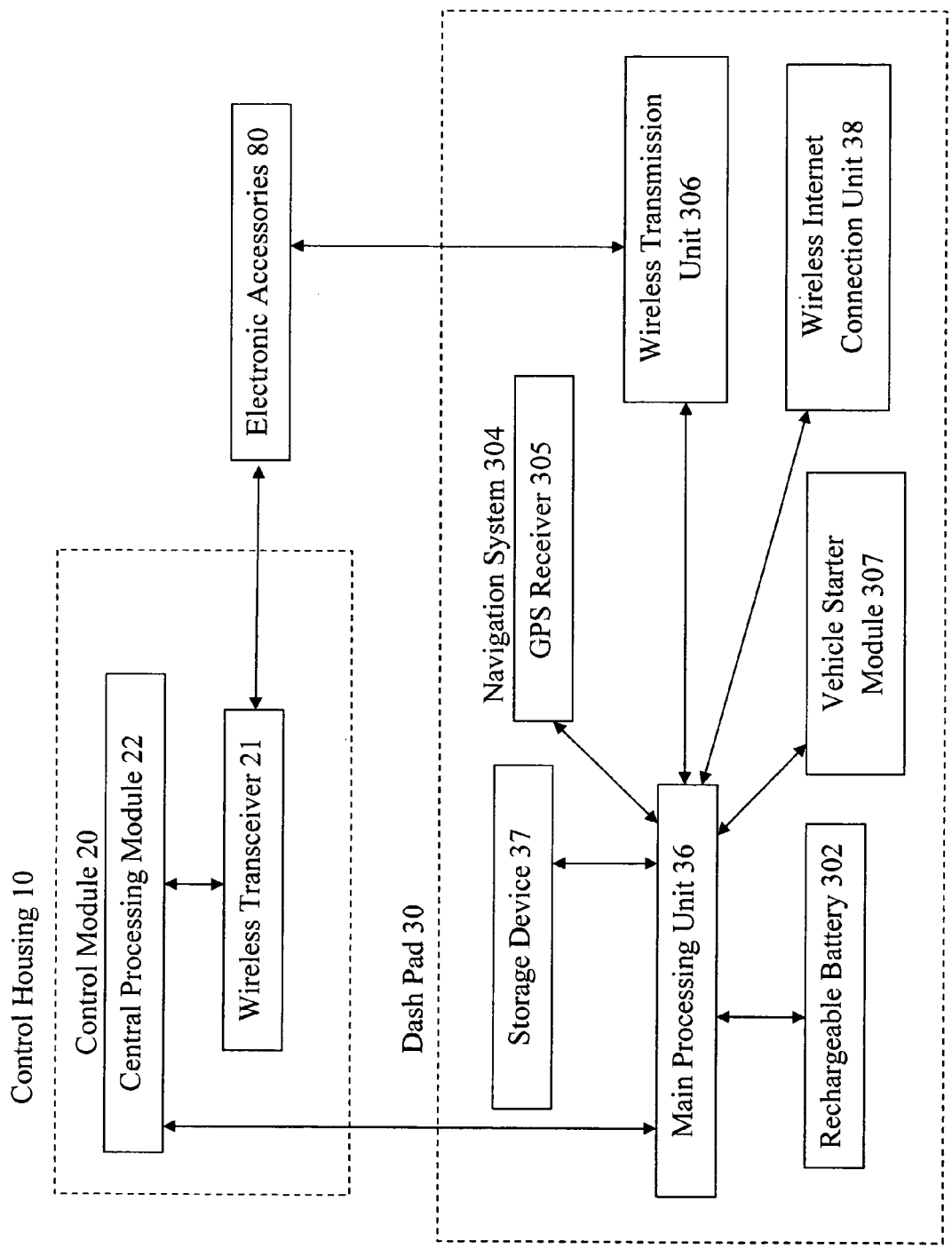
FIG. 2 is a block diagram of the multimedia system according to the above preferred embodiment of the present invention.
Figure 3:
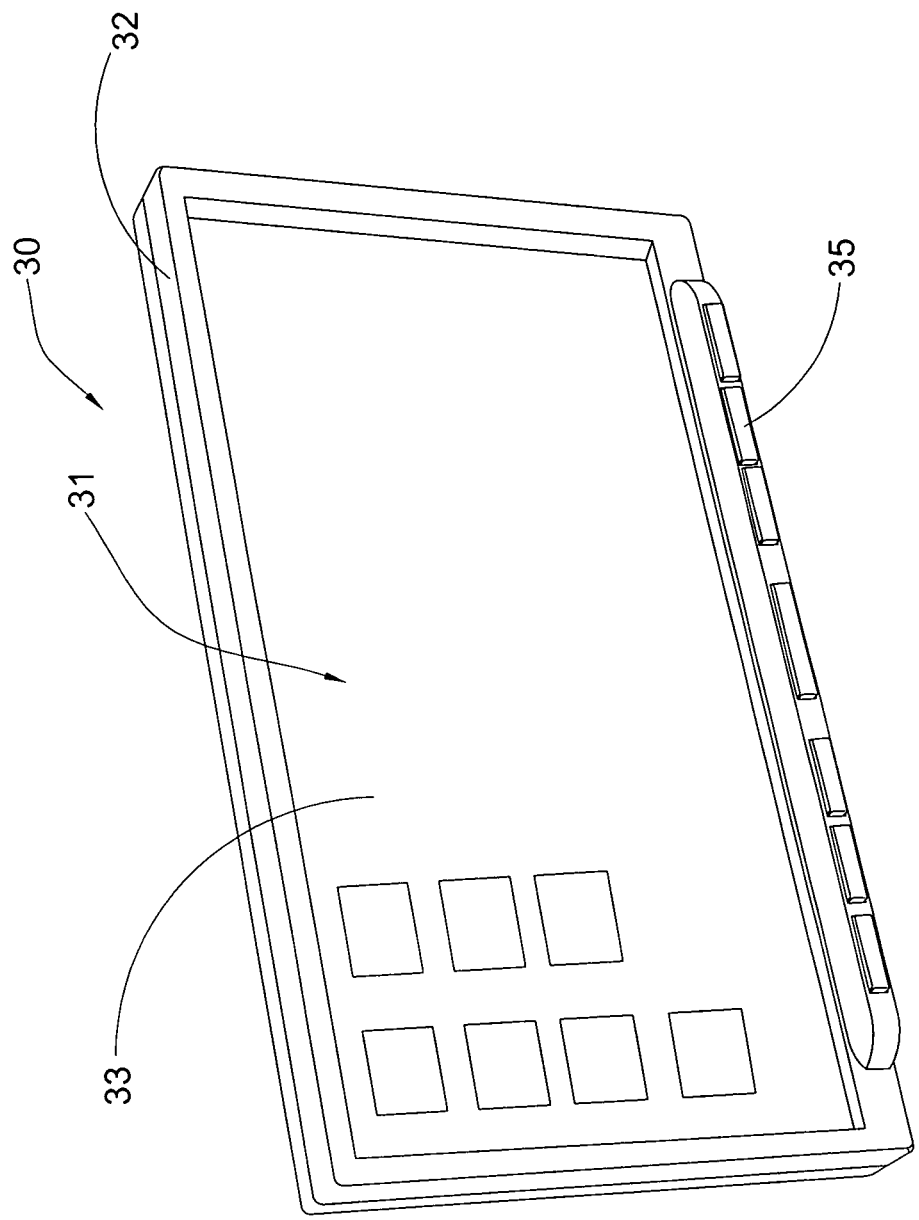
FIG. 3 is a perspective view of the dash pad according to the above preferred embodiment of the present invention.
Figure 4:
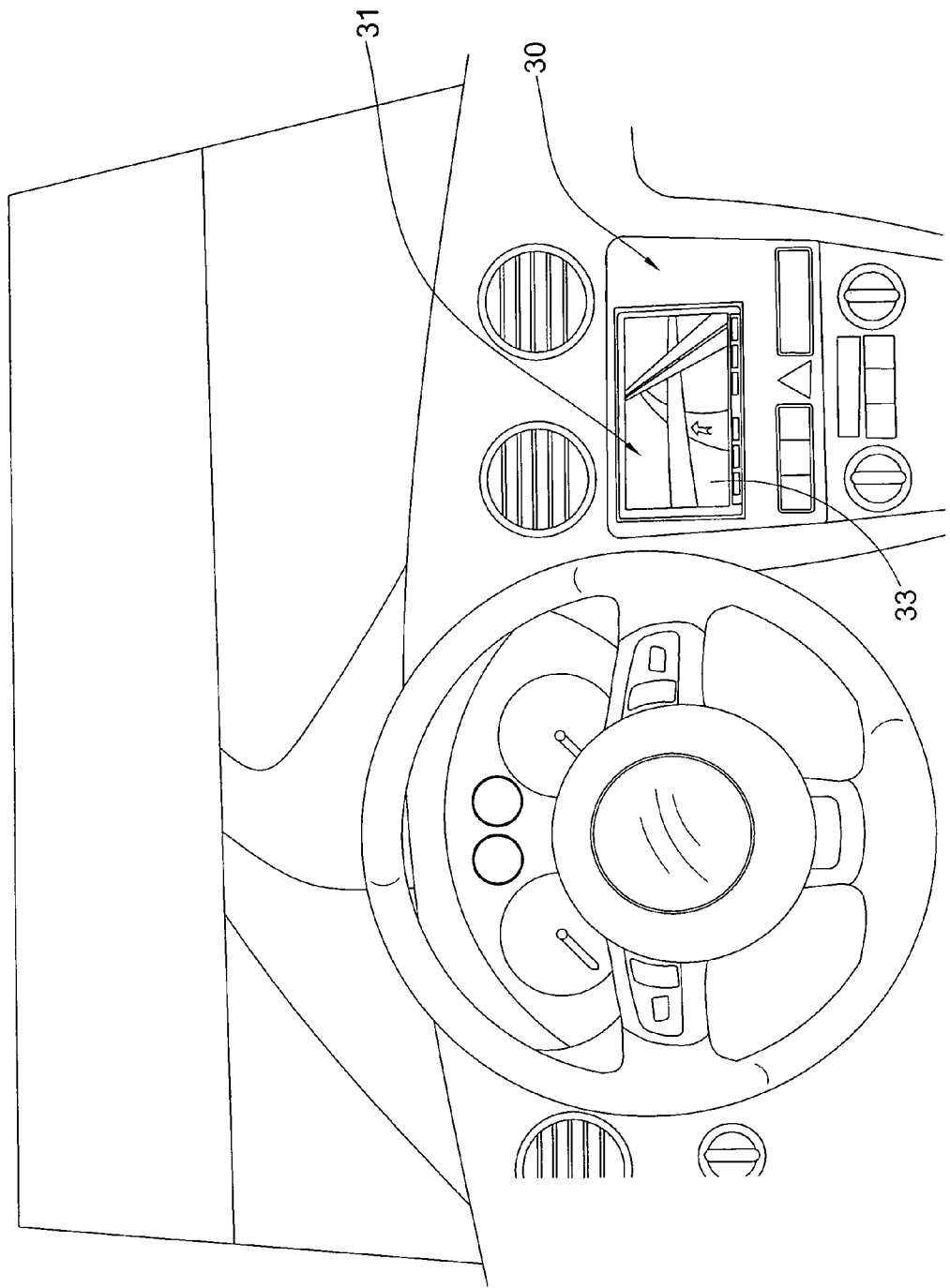
FIG. 4 is a schematic diagram of the dash pad according to the above preferred embodiment of the present invention.
Figure 5:
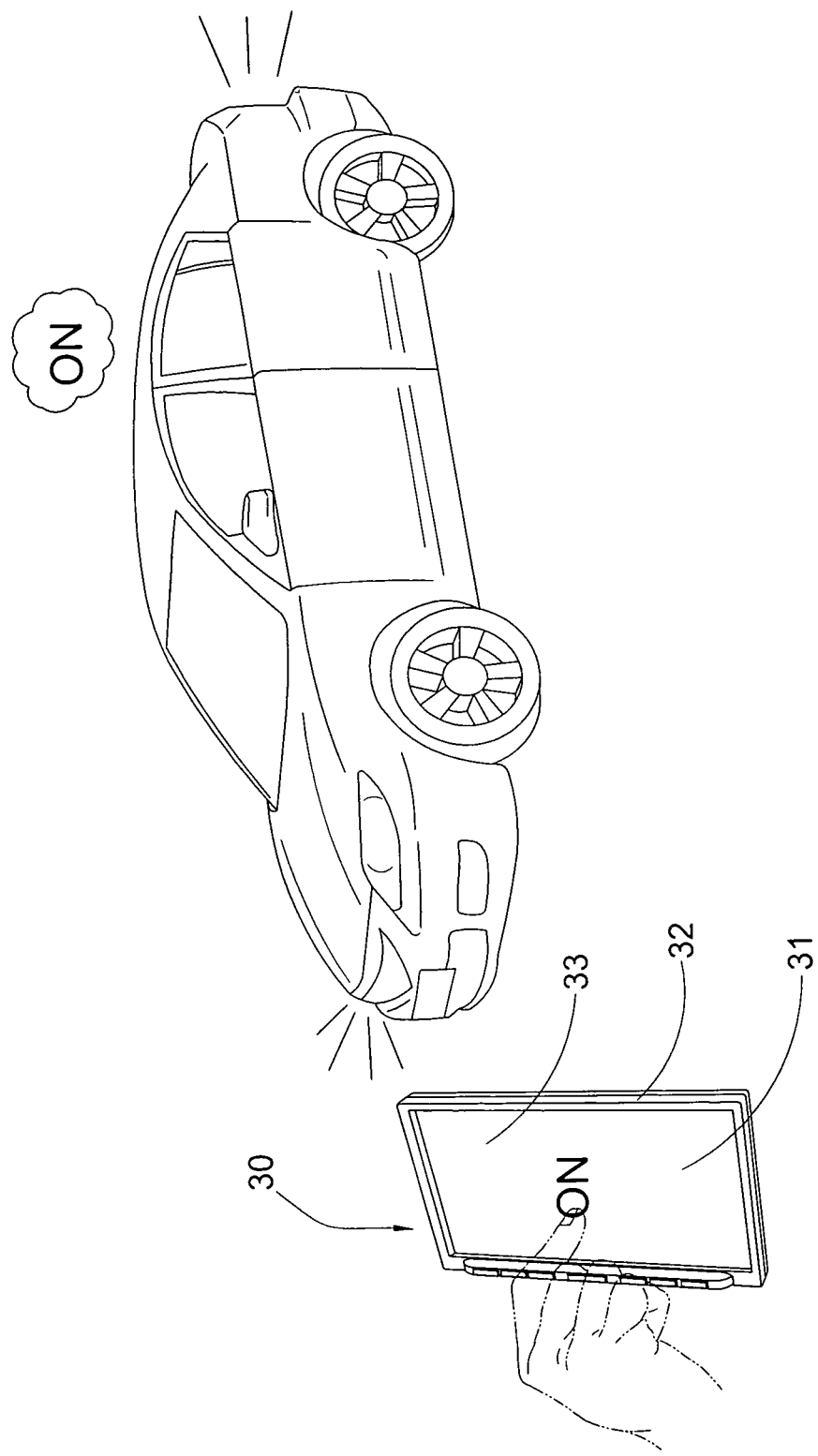
FIG. 5 is another schematic diagram of the dash pad according to the above preferred embodiment of the present invention.

Referring to FIG. 1 to FIG. 5 of the drawings, a multimedia system according to a preferred embodiment of the present invention is illustrated, in which the multimedia system comprises a control housing 10, a control module 20, and a dash pad 30. The multimedia system is for a vehicle such as a car having a plurality of electronic accessories 80, such as a speaker system, a navigation system, a multimedia player, and the likes. The control housing 10 is mounted in the vehicle, and preferably inside the passenger compartment of that vehicle.

On the other hand, the control module 20 is supported in the control housing 10, and comprises a central processing module 22 is electrically connected with the electrical accessories 80 in such a manner that the central processing module 20 is arranged to centrally control the electrical accessories 80 upon receipt of control commands originated from the dash pad 30. In other words, the central processing module 22, which is a single, is capable of controlling the electrical accessories 80.

The dash pad 30 is detachably mounted on the control housing 10 and is wirelessly communicated with the central processing module 22, wherein the dash pad 30 comprises a control panel 31 for allowing a user to input control commands on the control panel 31, wherein the control commands are wirelessly sent to the central processing module 22 and are processed so as to control the corresponding electrical accessories 80, so that the user is able wirelessly control the electrical accessories 80 in the vehicle through the control panel 31.

According to the preferred embodiment of the present invention, the control housing 10 has a substantial cubic main body 11 for receiving the control module 20, and a mounting platform 12 formed on a front side of the main body 11 for allowing the dash pad 30 to be detachably mounted on the mounting platform 12. When the multimedia system is in actual use, the cubic main body 11 is normally received inside the dashboard of the vehicle so that the user is only allowed to access the mounting platform 12 unless electrical wiring needs to be re-adjusted (as explained below).

The control housing 10 further comprises a plurality of electrical wires 13 extended from the control module 20 to an exterior of the control housing 10, wherein the electrical wires 13 are arranged to be connected to the corresponding electrical accessories 80 for transmitting control commands thereto. Each of the electrical wires 13 comprises a specifically designed plug for connecting with a corresponding electrical accessory 80 having the corresponding socket. The user has to connect the corresponding electrical wires 13 with the relevant electrical accessory 80 by consulting a user manual or by experience. According to the preferred embodiment of the present invention, the electrical accessories 80 comprises speakers, a navigation unit, a rear camera, a multimedia player such as a DVD player, a radio, and the likes. Each of these electrical accessories 80 are arranged to be connected with one of the electrical wires 13 for connecting with the control module 20. Moreover, one of the electrical wires 13 is connected to a power source of the vehicle so as to acquire power for the operation of the multimedia system of the present invention.

Note also that each of the electrical accessories 80 is connected to the power source of the vehicle so that they are readily operative when the control commands are sent out from the control module 20. Moreover, the control housing 10 further comprises a dash pad socket 14 provided on the mounting platform 12, wherein the mounting platform 12 is shaped and sized to correspond to that of the dash pad 30 for allowing the dash pad 30 to be fittedly yet detachably mounted onto the mounting platform 12.

The central processing module 22 of the control module 20 comprises a control circuitry mounted in the control housing 10, wherein the central processing module 22 is electrically connected with the electrical wires 13 for transmitting control commands to the corresponding electrical accessories 80. The control module 20 further comprises a wireless transceiver 21 provided in the control housing 10 for wirelessly communicating the central processing module 22 with the dash pad 30. Thus, the dash pad 30 is capable of wirelessly transmitting the control commands to the central processing module 22 through the wireless transceiver 21. Similarly, the central processing module 22 is capable of transmitting user interactive signals to the dash pad 30 through the wireless transceiver 21 for informing the user as to the operation status of the electrical accessories 80.

The dash pad 30 comprises a main body 32 and a touch screen 33 provided on a front side of the main body 32, wherein the control panel 31 is formed on the touch screen 33 so that the user is able to press on a relevant control button on the touch screen 33. In order to connect the dash pad 30 with the control housing 10, the dash pad 33 further comprises a connection plug 34 provided on a rear side of the main body 32 and is aligned with the dash pad socket 14 of the control housing 10. Thus, the user is able to detachably insert the connection plug 34 into the dash pad socket 14 so as to detachably mount the dash pad 30 on the mounting platform 12 of the control housing 10.

Furthermore, the dash pad 30 further comprises a plurality of auxiliary control buttons 35 provided on the main body 32, wherein the auxiliary control buttons 35 are primarily used for providing additional control to the dash pad 30 or the electrical accessories 80. For example, one of the auxiliary control buttons 35 may be a power switch of the dash pad 30 itself so that whenever the power switch is pressed, the dash to pad 30 will be turned on immediately. This is merely an example and many other operations can be controlled by the auxiliary control buttons 35. Thus, one of the auxiliary control buttons 35 can be a short key for activating certain function, such as radio function.

It is important to mention that the dash pad 30 itself can be programmed and utilized as a tablet computer apart from controlling the electrical accessories 80 in the vehicle. Thus, the dash pad 30 further comprises a main processing unit 36 and a storage device 37 for processing and storing digital data. When properly programmed, the dash pad 30 can perform functions resembling to a tablet computer. In order for the dash pad 30 to get connected to internet, the dash pad 30 further comprises a wireless internet connection unit 38 provided in the main body 32 for transmitting signal from and to the internet. The wireless internet connection unit 38 may utilize more than one method to get access to internet, such as through Wi-Fi or data network. Once connected to internet, the dash pad 30 is capable of performing such functions as internet browsing and downloading.

The dash pad 30 further comprises a memory slot 39 provided on the main body 32 wherein external flash memory can be inserted into the memory slot 39 for expanding a memory capacity of the dash pad 30, and for allowing external data to be transferred into the built-in storage device 37 of the dash pad 30. Thus, a user is able to save his or her own video files in a flash memory and transfer or play that video file by the dash pad 30 when the external flash memory is inserted into the memory slot 39.

Apart from acquiring data directly from external flash memory, the dash pad 30 may acquire data from other devices, such as an external hard drive or even from a laptop computer itself. Conversely, a user may want to transfer date from the dash pad 30 to other devices, such as his or own computer. Thus, the dash pad 30 further comprises at least one USB port 300 provided on the main body 32 wherein a user is able to connect external devices, such as a computer, to the dash pad 30 through the USB port 300 by using a conventional USB cable.

Furthermore, in order to support multimedia activity, the dash pad 30 further comprises at least one speaker 301 formed on the main body 32 for delivering audible voice corresponding to the activity performed by the main processing unit 36. For example, if the dash pad 30 is playing a video file (either pre-stored in the storage device 37 or streaming from internet), the speaker 301 is then arranged to deliver the sound stored in the video file. Note that the audio file may also be transferred to the control housing 10 so that the audible voice is delivered by the speaker as one of the electrical accessories 80 of the vehicle.

In order to supply electricity to the dash pad 30, it further comprises a rechargeable battery 302 provided in the main body 32 for providing electricity to all other components of the dash pad 30. Thus, the dash pad further comprises a recharging port 303 provided on the main body 32 for acquiring electricity from an external power source. Thus, the rechargeable battery 302 may be recharged by mounting the dash pad 30 onto the control housing 10 so that it can be recharged by the power generated by the vehicle, or by connecting the dash pad 30 to an external power source through the recharging port 303. The latter method is usually used when the dash pad 30 is detached from the control housing 10 and is used as a standalone tablet computer or controller for the electrical accessories 80.

The dash pad 30 further comprises a navigation system 304 provided in the main body 32 and comprises a GPS receiver 305 electrically connected to the main processing unit 36 for receiving wireless signal which indicate a current position of the dash pad 30. When the vehicle does not have a built-in navigation system, the dash pad 30 may provide one and can be used as a standalone navigator for the vehicle.

The dash pad 30 further comprises a wireless transmission unit 306 provided in the main body 32 wherein control commands are wirelessly sent to the wireless transceiver 21 of the control module 20 through the wireless transmission unit 306. The wireless signal transmission technology may be embodied as RF signal transmission, Bluetooth signal transmission, or other similar wireless signal transmission technologies.

The dash pad 30 further comprises a vehicle starter module 307 electrically connected to the wireless transmission unit 306 and the main processing unit 36, wherein the vehicle starter module 307 is arranged to remotely start actuate starting up of the vehicle in which the dash pad 30 is to be mounted so as to allow the user to remotely start up the vehicle before he or she gets into the car. This helps the user to pre-warm the vehicle so that when he or she gets into the vehicle, he or she can start driving it immediately.

The operation of the present invention is as follows: the dash pad 30 may be used for controlling the electrical accessories 80 in a vehicle. When this happens, the user may operate the control panel 31 for remotely controlling the operation of the electrical accessories 80. This can be done while the dash pad 30 is mounted on the control housing 10 or is detached therefrom. On the other hand, the dash pad 30 may be programmed to perform many functions which can also be performed by a computer. For example, the dash pad 30 may be programmed to have the ability to browse websites, send emails, perform word processing, play games etc. Thus, the dash pad 30 can be adapted for use as a tablet computer wherein the control panel 31 is used primarily as an input device for that tablet computer. A user may be able to expand memory by inserting an external memory card through the memory slot 39. Moreover, the user may be able to connect the dash pad 30 as a tablet computer to other devices through the USB port 300.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vehicle accessory control system comprising:
a control housing; and
a dash pad;
wherein said control housing is configured to be installed in a dashboard of a vehicle and comprises a control module;
wherein said control module is connected to, and configured to control, one or more electrical accessories of said vehicle when said control module sends one or more first control commands to said one or more electrical accessories of said vehicle;
wherein said dash pad is configured to removeably attach to said control housing and is configured to communicate with said control module of said control housing by sending one or more second control commands to said control module;
wherein said one or more second control commands cause said control module to send said one or more first commands, such that said one or more second control commands control said one or more electrical accessories of said vehicle;
wherein said dash pad comprises a control panel configured to allow a user to control said one or more electrical accessories of said vehicle, such that, when said user inputs one or more user commands into said control panel, said dash pad sends said one or more second control commands to control said one or more electrical accessories of said vehicle; and
wherein said dash pad allows a user to control said one or more electrical accessories of said vehicle remotely by wirelessly transmitting said one or more second commands to said control housing installed in said vehicle.

2. The vehicle control system, as recited in claim 1, wherein said dash pad comprises: a main processing unit and a rechargeable battery;
wherein said rechargeable battery supplies power to said dash pad when said dash pad is not connected to said control housing;
wherein said main processing unit and said control panel of said dash pad allows said dash pad to operate independently from said control housing, such that said dash pad functions as a standalone tablet computer that is configured to allow said user to browse the Internet and download one or more files.

3. The vehicle control system, as recited in claim 1, wherein said dash pad comprises a touch screen provided on a front side thereof, wherein said control panel is formed on said touch screen for enabling said user controlling said electrical accessories through said touch screen.

4. The vehicle control system, as recited in claim 2, wherein said dash pad comprises a touch screen provided on a front side thereof, wherein said control panel is formed on said touch screen for enabling said user controlling said electrical accessories through said touch screen.

5. The vehicle control system, as recited in claim 1, wherein said dash pad further comprises a storage device linked to said central processing module for storing digital data, such that said dash pad is self-operated for processing said digital data in said storage device.

6. The vehicle control system, as recited in claim 4, wherein said dash pad further comprises a storage device linked to said central processing module for storing digital data, such that said dash pad is self-operated for processing said digital data in said storage device.

7. The vehicle control system, as recited in claim 5, wherein said dash pad further comprises at least one USB port and a memory slot for expanding a memory capacity of said dash pad and for allowing external data to be transferred into said storage device of said dash pad.

8. The vehicle control system, as recited in claim 6, wherein said dash pad further comprises at least one USB port and a memory slot for expanding a memory capacity of said dash pad and for allowing external data to be transferred into said storage device of said dash pad.

9. The vehicle control system, as recited in claim 1, wherein said dash pad further comprises a wireless internet connection unit linked to said main processing unit for enabling said dash pad to be self-operated to gain access to internet.

10. The vehicle control system, as recited in claim 8, wherein said dash pad further comprises a wireless Internet connection unit linked to said main processing unit for enabling said dash pad to be self-operated to gain access to internet for internet browsing.

11. The vehicle control system, as recited in claim 1, wherein said dash pad further comprises at least one speaker for delivering audible voice when said dash pad is self-operated, wherein when said dash pad is connected to said control module, said dash pad transfers said audible voice to said control module which delivers said audible voice to a vehicle speaker as one of said electrical accessories of said vehicle.

12. The vehicle control system, as recited in claim 10, wherein said dash pad further comprises at least one speaker for delivering audible voice when said dash pad is self-operated, wherein when said dash pad is connected to said control module, said dash pad transfers said audible voice to said control module which delivers said audible voice to a vehicle speaker as one of said electrical accessories of said vehicle.

13. The vehicle control system, as recited in claim 1, wherein said dash pad further comprises a navigation system and a GPS receiver electrically connected to said main processing unit for indicating a current position of said dash pad, such that said dash pad forms a standalone navigator for said vehicle.

14. The vehicle control system, as recited in claim 12, wherein said dash pad further comprises a navigation system and a GPS receiver electrically connected to said main processing unit for indicating a current position of said dash pad, such that said dash pad forms a standalone navigator for said vehicle.

15. The vehicle control system, as recited in claim 1, wherein said dash pad further comprises a vehicle starter module electrically connected to said main processing unit, wherein said vehicle starter module is arranged for remotely actuating starting up of said vehicle so as to allow a user to remotely start up said vehicle before getting into said vehicle.

16. The vehicle control system, as recited in claim 14, wherein said dash pad further comprises a vehicle starter module electrically connected to said main processing unit, wherein said vehicle starter module is arranged for remotely actuating starting up of said vehicle so as to allow a user to remotely start up said vehicle before getting into said vehicle.

17. A vehicle control system, comprising:
a control housing; and
a dash pad;
wherein said control housing is configured to be installed in a dashboard of a vehicle and comprises a control module;
wherein said control module is connected to, and configured to control, one or more electrical accessories of said vehicle when said control module sends one or more first control commands to said one or more electrical accessories of said vehicle;
wherein said dash pad is configured to removeably attach to said control housing and is configured to communicate with said control module of said control housing by sending one or more second control commands to said control module;
wherein said one or more second control commands causes said control module to send said one or more first commands, such that said one or more second control commands control said one or more electrical accessories of said vehicle;
wherein said dash pad comprises a control panel configured to allow a user to control said one or more electrical accessories of said vehicle, such that, when said user inputs said one or more user commands into said control panel, said dash pad sends said one or more second control commands to control said one or more electrical accessories of said vehicle;
wherein said dash pad allows a user to control said one or more electrical accessories of said vehicle remotely by wirelessly transmitting said one or more second commands to said control housing installed in said vehicle; and
wherein said dash pad further is configured to remotely start an engine of said vehicle before said user enters said vehicle.

18. The vehicle control system, as recited in claim 17, wherein said dash pad further comprises a rechargeable battery;
wherein said rechargeable battery supplies power to said dash pad when said dash pad is not connected to said control housing;
wherein said main processing unit and said control panel of said dash pad allows said dash pad to operate independently from said control housing, such that said dash pad functions as a standalone tablet computer that is configured to allow said user to browse the Internet and download one or more files.

19. The vehicle control system, as recited in claim 18, further comprising at least one USB port and a memory slot for expanding a memory capacity of said dash pad and for allowing external data to be transferred into said storage device.

20. The vehicle control system, as recited in claim 18, further comprising a wireless internet connection unit linked to said main processing unit for enabling said dash pad to be self-operated to gain access to internet for internet browsing.

21. The vehicle control system, as recited in claim 18, further comprising at least one speaker for delivering audible voice when said dash pad is self-operated, wherein when said dash pad is connected to said control module, said dash pad transfers said audible voice to said control module which delivers said audible voice to a vehicle speaker as one of said electrical accessories of said vehicle.

22. The vehicle control system, as recited in claim 18, further comprising a navigation system and a GPS receiver electrically connected to said main processing unit for indicating a current position of said dash pad, such that said dash pad forms a standalone navigator for said vehicle.

23. The vehicle control system, as recited in claim 18, wherein said one or more electrical accessories is selected form the group of electrical accessories consisting of: a multimedia player, a rear camera, and a radio.

* * * * *